Jan. 14, 1930. R. J. HASKELL 1,743,967
AIRPLANE
Filed Oct. 11, 1928 3 Sheets-Sheet 1

INVENTOR
Robert J. Haskell
BY
ATTORNEY

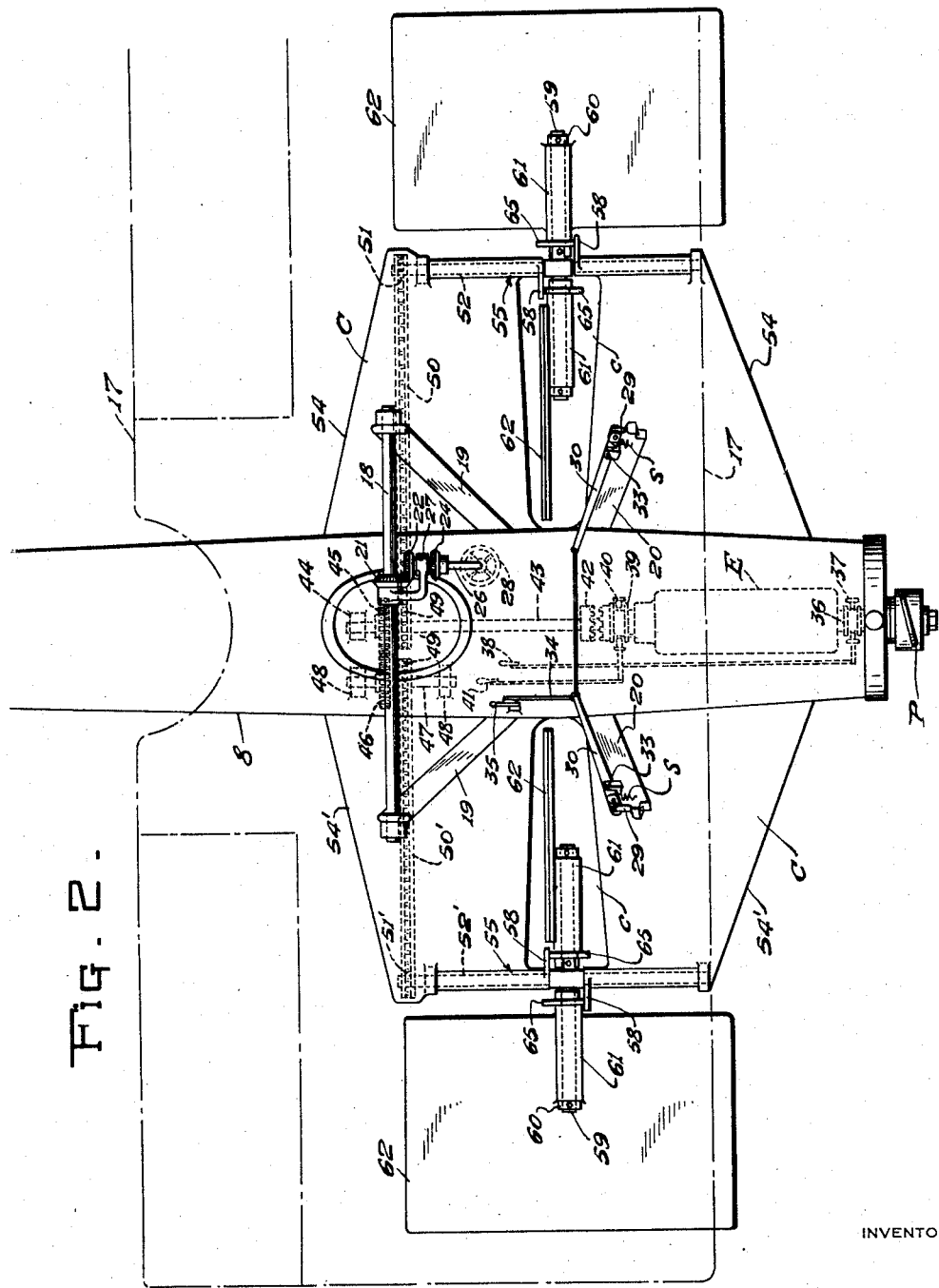

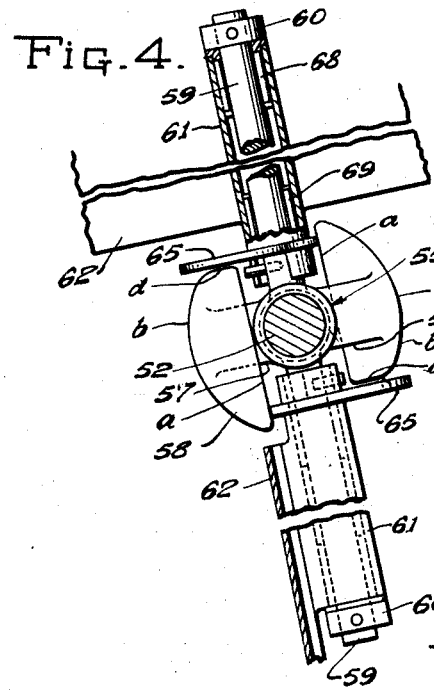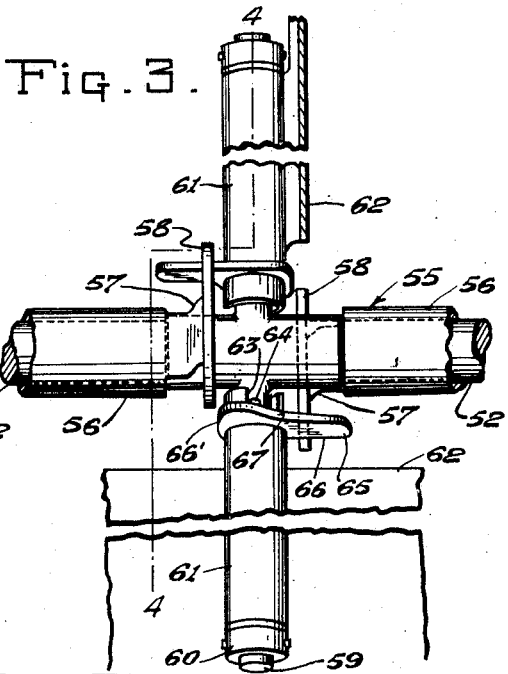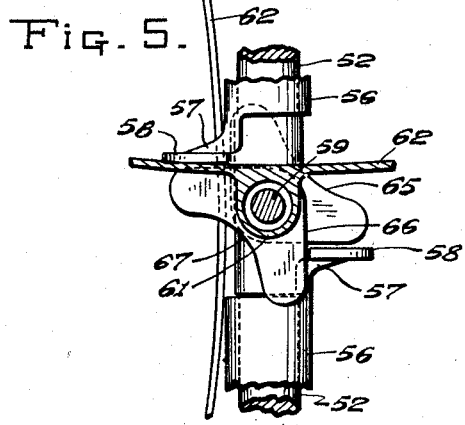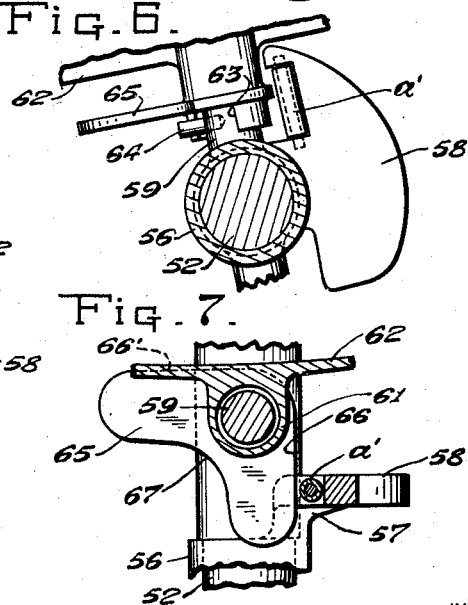

Patented Jan. 14, 1930

1,743,967

UNITED STATES PATENT OFFICE

ROBERT J. HASKELL, OF WASHINGTON, DISTRICT OF COLUMBIA

AIRPLANE

Application filed October 11, 1928. Serial No. 311,800.

The present invention relates to improvements in airplanes, one object of the invention being the provision of a mechanism associated with the fuselage and plane or wing member of an airplane by means of which said airplane may be elevated in an approximately perpendicular direction from the ground and thus obviate the necessity of long runways or fields and the necessary high speed which must be attained to lift the present type of airplane from the ground or runway.

A further object of the present invention is the provision of oppositely disposed equally effective elevating means disposed normally beneath the out-spreading wings of the airplane, but which, when in use for elevating the same, have an unobstructed action upon the air due to a novel arrangement of tilting mechanism for the wing or plane.

A still further object of this invention is the provision of elevating propellers which, when operated, exert a downward pressure upon the air and which, when the plane is moving in a horizontal or travelling position, are rendered inoperative and produce, when in such position, the least possible skin friction due to the action of the air thereon, there being provided encasing air-conducting means through which the non-active elevating means passes and is shielded during such time.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the drawings:—

Figure 2 is a top plan view of the portion of the mechanism adjacent the fuselage with the wings shown in dotted lines and the present elevating mechanism in full lines.

Figure 3 is a view in plan of the axis portion of one of the present elevating mechanisms, parts being shown in section and broken away.

Figure 4 is a section taken on line 4—4 of Figure 3.

Figure 5 is a view illustrating the operation of the elevating blades or paddles in edge elevation, one of said blades being in section.

Figures 6 and 7 are detail views showing a modified anti-frictional means carried by the blades for cam actuation and engagement.

Figure 1:
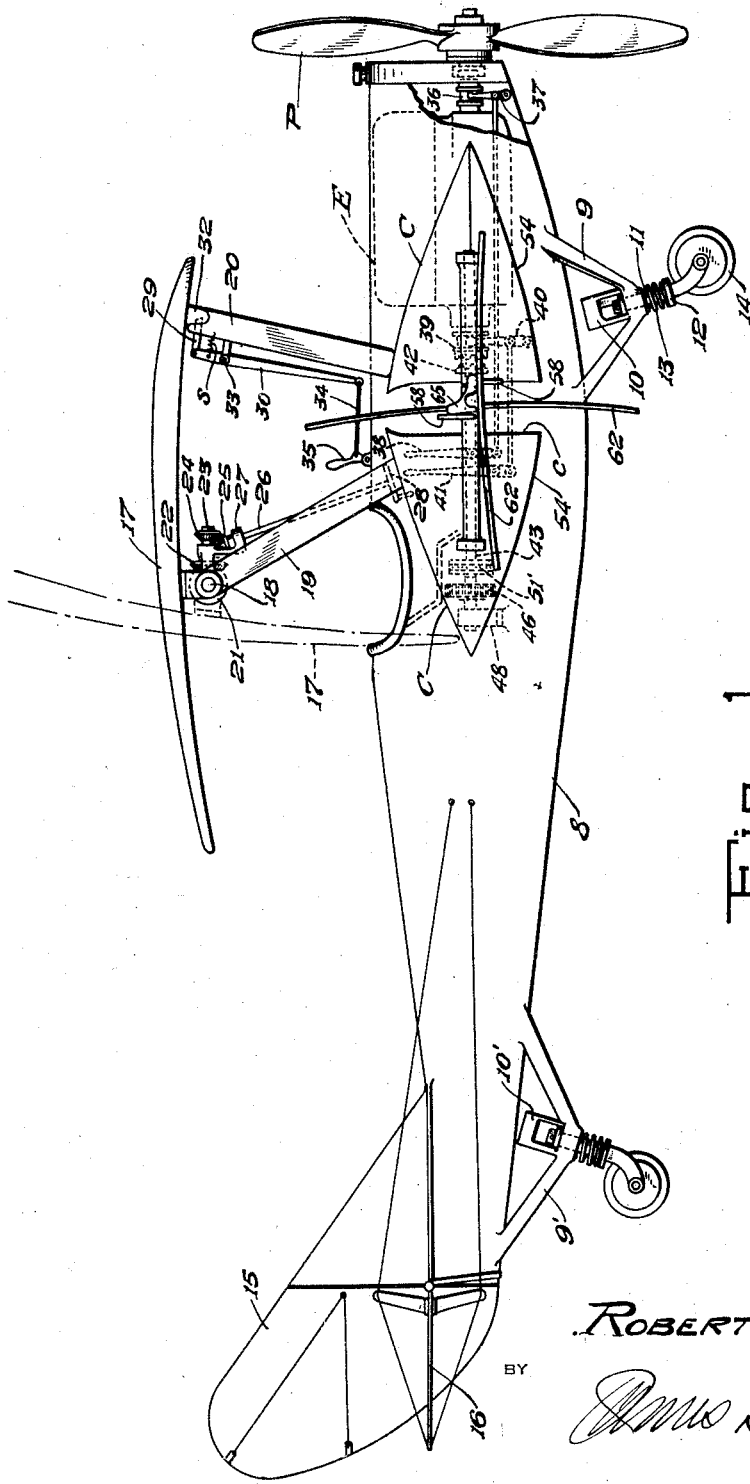
Figure 1 is a side elevation of an airplane constructed according to and embodying the present invention, dotted lines illustrating the position of the plane or wing while the airplane is rising vertically from the ground.

Referring to the drawings, the numeral 8 designates the fuselage which is indicative of any type of fuselage that may be used in airplane construction, the same being provided with the front struts 9 and the rear strut 9', each one of which is identical and is provided with a housing 10 which provides a means for the reception of the free end of a spindle 11 which is normally extended through the disk 12 and the spring 13 away from the strut 9, but which, when in engagement with the ground, or when alighting upon the ground, compresses the spring, and, therefore, projects toward the cap 10, a rubber-tired wheel 14 being provided as the ground-engaging member.

The present type of plane is here shown with a vertical rudder 15 and with the usual horizontal elevators 16, while mounted in the body, or any desired place, is the motor or engine E, the usual tractor propeller P being mounted at the forward end of the fuselage.

The wing or plane member 17 is of usual construction but is supported between its forward and rear edges by a shaft 18 pivoted for swinging movement by the upper ends of the rear struts 19 which are shown directly above the cockpit of the fuselage, and is supported adjacent its forward edge by the forward struts 20, shown as carried by the fuselage slightly to the rear of the engine. By this means the wing 17 may be moved from the full line position in Figure 1 to the dotted line position, the purpose of which will presently appear, this being accomplished through the medium of the gear 21 which is fast to the shaft 18 and meshes with the gear 22 carried upon the short shaft 23. This short shaft, as here shown, is provided with the gear 24 which, in turn, meshes with the gear 25 carried by the operating shaft 26, the gears 22, 24 and 25 and shafts for same being mounted in a suitable casting 27 adjacent the upper ends of the strut 19 and the operating wheel 28 for the shaft 26 being disposed adjacent the cockpit in ready access to the aviator.

The wing or plane member 17 carries adjacent its forward edge a depending projection 32 for receiving the latch or bolt 29 which is here shown as carried by the lever 30 pivoted at 33 and held in engagement with the projection 32 by the spring s, a link 34 being connected to the lower end of said lever 30 and operable through the hand lever 35 in ready access to the aviator. Thus, when it is desired to move the wing 17 from the full to the dotted line position, the aviator operates the lever 35 to release the bolt 29 and then rotates the shaft 26 through the hand wheel 28, thus actuating the gearing before-mentioned.

Although a gearing is here illustrated as being desirable for operating the wing, limitation to this particular construction is not contemplated as it may be possible to use other mechanism with the necessary strength and extreme lightness desirable in airplane construction.

At the forward end of the shaft of the engine there is mounted a clutch 36 which, through the lever yoke 37, suitable linkage and the hand-lever 38, may be thrown into and out of engagement to connect or disconnect the propeller P from the engine, while also mounted upon the engine shaft at the rear of the engine is a sliding clutch member 39 operated through the yoke lever 40, suitable linkage and the hand-lever 41 to engage at will the clutch member 42 fixed upon the auxiliary shaft 43. The shaft 43 is designed and arranged to operate, as will presently appear, the mechanism for elevating the airplane as nearly perpendicularly as is possible. This mechanism includes the bearing 44 and a gear 45 carried by the shaft 43, said gear 45 meshing with the gear 46 mounted upon a counter-shaft 47 which, in turn, is journaled in the bearings 48. Thus, when the shaft 43 is rotated, the two gears 45 and 46 are rotated. Sprocket wheels 49 and 49' are mounted, respectively, upon the shafts 43 and 47 and each, in turn, through its sprocket chain 50 or 50', actuates a sprocket wheel 51 or 51'. The sprockets 51 and 51' are keyed, respectively, to the shafts 52 and 52' which extend lengthwise of the fuselage. The shafts 52 and 52' are journaled in the outrigger frames 54, 54' supported upon and extending from opposite sides of the fuselage frame. Also supported by each outrigger frame is an air-deflecting means or covering C which, as shown in Figure 1, is provided with openings c, the purpose of which will presently appear.

As the elevating mechanisms, designated generally as 55, are identical in construction, although disposed upon opposite sides to operate in opposite directions, a description of one will suffice for both, and particular attention is invited to Figures 3, 4 and 5 wherein the shaft 52 is shown as mounted and rotating in two oppositely disposed sleeves 56, each of which sleeves is fixedly secured to the outrigger frame 54 and is provided with an offset arm 57 carrying a cam 58. Each cam, as shown in Figure 4, is provided with a straight actuating edge a, a long curved edge b, and an abrupt relatively flat edge d, the purpose of which will presently appear. Each shaft 52 or 52' carries two oppositely disposed or diametrically extending arms 59, each of which is provided with a limiting collar 60 adjacent the free end thereof and has a sleeve 61 mounted for oscillation thereon, which sleeve carries a blade or paddle 62 which is slightly concaved in transverse section. Connected to each sleeve 61 adjacent its inner end is a cam arm 65 provided with two straight edges 66 at a right angle to one another and an inwardly curved edge 67 between the edges 66 and 66', and, in order to limit the movement of the sleeve 61 upon its arm 59, a recess 63 is formed in the edge of the inner end of the sleeve and fits astride a pin 64 carried by its supporting arm 59.

Assuming the parts to be in the position shown in Figure 3, that is to say with one blade 62 extending outwardly of the outrigger frame 54 and in a substantially horizontal position and the other blade 62 in a substantially vertical position in the vertical opening c of the outrigger frame 54, when the shaft 52 is rotated one straight edge 66 of the cam 65 carried by the sleeve 61 on which the first-named blade is mounted will bear against the straight edge a of a cam 58. The sleeve 61 will be rocked on its shaft and the straight edge 66 of the cam 65 will ride over the side or face of the cam 58 which is directed toward the arms 59 until the other straight edge 66' of the cam 65 comes into engagement with the straight edge a of the other cam 58 to rock the sleeve 61 in the opposite direction so as to again present the straight edge 66 of the cam 65 to the straight edge a of the first mentioned cam 58. During this movement each sleeve 61 and the blade 62 carried thereby will be rotated approximately 90°, this movement occurring while one blade is rising through the space c of the air deflector C, and the other blade is fully exposed while turning and moving downwardly with its air-engaging surface directed toward the ground and not starting to turn until it has exerted the desired pressure upon the air to lift the airplane through this instrumentality.

As two of these elevating mechanisms are provided and both are operated in synchrony, there is an even action upon the air as the blades are disposed at opposite sides of the fuselage and, therefore, the plane will be elevated from the ground, and, as the wing 17 is then in the dotted line position shown in Figure 1, the wing 17 will offer no resistance to the rise of the airplane.

As shown in Figures 6 and 7, the fixed cams 58 may each be provided with a small antifrictional roller $a'$ adjacent the straight edge thereof and over which cam face 66 of the movable cam arm 65 may slide.

Also, as shown in Figure 4, the respective sleeves 61 are mounted on roller-bearings 68 and 69.

From the foregoing description, taken in connection with the drawings, it is evident that when an airplane constructed according to the present invention is resting upon the ground and the engine is started with the propeller P thrown out of engagement with the engine through the medium of the lever 38 and clutch 36, and with the wing or plane member 17 moved to dotted line position, shown in Figure 1, by shifting the lever 41 the clutch member 39 will be engaged with the clutch member 42 carried by the shaft 43, the shaft 43 will be rotated by the engine, and, in turn, through the drive chains 50 and 50', both shafts 52 and 52' will be rotated simultaneously and thus cause the sleeves 61 to be rocked and the blades 62 to move outwardly and downwardly away from the fuselage and thus act upon the air to lift or elevate the airplane. When the airplane has been lifted a sufficient distance above the ground the lever 41 is shifted to actuate the clutch 36 and connect the propeller P to the engine, after which the hand wheel 28 is turned to move the wing 17 from the position as shown in dotted lines in Figure 1 to the full line position, whereupon the lever 41 is shifted to disconnect the clutch 39 and thus disconnect the elevating propellers or blades 62 and their operating mechanism from the engine and permit the plane to operate in its usual manner.

I claim:—

1. In an airplane, a fuselage, an engine and a tractor propeller carried by said fuselage, a clutch between said engine and propeller, a pair of shafts carried by the fuselage and mounted to rotate, respectively, on axes extending substantially lengthwise of said fuselage on opposite sides of and spaced from the latter, means including a clutch between the said engine and said shafts for rotating said shafts, a pair of arms extending radially in opposite directions from each of said shafts, a blade mounted to rock on each of said arms during the rotation of said shaft, fixed means associated with said shaft and means secured to said blades and engageable directly with said fixed means during rotation of said shafts to alternately rock each of said blades from the horizontal to the vertical position.

2. In an airplane according to claim 1 wherein each of the arms and the blade carried thereby are provided with cooperating means for limiting the rocking movement of such blade during the rotation of the shaft.

3. In an airplane including a fuselage, propelling means for elevating the airplane in substantially a vertical direction, said means comprising a pair of rotatable shafts extending substantially lengthwise of the fuselage, one on each side of the latter, a pair of arms extending radially in opposite directions from each of said shafts, an oscillatory sleeve mounted upon each of said arms, cooperative means between each arm and the sleeve carried thereby for limiting the oscillatory movement of the sleeve, a propeller blade carried by each sleeve and movable into parallelism with the axis of the shaft and into a position at right angles thereto, and cooperating means carried adjacent each rotary shaft and in the path of the oscillatory sleeves and operative in the rotation of said shaft to impart oscillatory movement to said sleeves, the sleeves associated with each shaft being oscillated simultaneously in opposition to each other to cause one blade of each pair to act as a pressure means upon the atmosphere and the other blade of such pair to cleave the atmosphere.

4. In an airplane, a fuselage, an engine therein, a tractor propeller carried by the fuselage, a clutch between said engine and said propeller, a plane attached to the fuselage for horizontal tilting movement, two outrigger frames connected, respectively, to the fuselage at opposite sides of the latter, air-deflecting means encasing said frames, two elevating propelling mechanisms, one mounted in each outrigger, selective means for simultaneously connecting both elevating mechanisms to the engine, and means for tilting the plane to permit free access of the air to the elevating propelling mechanism.

5. In an airplane according to claim 4 in which each elevating propelling mechanism includes a rotary shaft having oppositely extending arms, an oscillatory blade mounted upon each arm, and cooperative means adjacent the shaft and carried by each blade whereby the blades are oscillated to successively act upon the air in a downward and outward direction and to cleave the air in a rearward and upward movement as the shaft is rotated, the blades during their rearward and upward movement being protected by the air-deflecting means.

6. An airplane according to claim 1 having a pair of air deflecting members extending longitudinally of the fuselage at each side of the latter and between the fuselage and each of the shafts, said air deflecting members being spaced apart longitudinally of the fuselage for the passage of the blades therebetween during the upward movement of the latter.

In testimony whereof I have hereunto set my hand.

ROBERT J. HASKELL.